US007231956B2

(12) United States Patent
Gregory et al.

(10) Patent No.: US 7,231,956 B2
(45) Date of Patent: *Jun. 19, 2007

(54) METHOD FOR MAKING A TERMINATION FOR A WIRE ROPE FOR MINING EQUIPMENT

(75) Inventors: George Robert Gregory, P.O. Box 8572, Tyler, TX (US) 75711-8572; Robert McClure Love, III, Tyler, TX (US)

(73) Assignee: George Robert Gregory, Flint, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/825,658

(22) Filed: Apr. 14, 2004

(65) Prior Publication Data

US 2005/0230075 A1  Oct. 20, 2005

(51) Int. Cl.
 *B23K 23/00* (2006.01)
 *B29B 13/00* (2006.01)
(52) U.S. Cl. ............... 164/54; 228/234.3; 249/86; 264/259; 264/271.1
(58) Field of Classification Search .......... 164/54; 249/86; 264/259, 265, 271.1; 425/116; 228/234.3
 See application file for complete search history.

(56) References Cited

U.S. PATENT DOCUMENTS

| | | | | |
|---|---|---|---|---|
| 2,151,032 A | | 3/1939 | Jensen ..................... 29/148 |
| 3,786,554 A | * | 1/1974 | Little ..................... 29/461 |
| 3,901,610 A | * | 8/1975 | Mason .................... 403/78 |
| 4,317,640 A | * | 3/1982 | Peeling ................... 403/36 |
| 4,405,083 A | * | 9/1983 | Charlebois et al. ....... 249/97 |
| 4,602,891 A | * | 7/1986 | McBride ................. 403/211 |
| 4,881,677 A | * | 11/1989 | Amos et al. ............. 228/33 |
| 5,211,500 A | * | 5/1993 | Takaki et al. ........... 403/269 |
| 6,035,692 A | | 3/2000 | Lucas ..................... 72/416 |
| 6,158,093 A | * | 12/2000 | Bergeron ................ 24/129 R |
| 6,170,145 B1 | | 1/2001 | Lucas ..................... 29/517 |
| 6,316,125 B1 | * | 11/2001 | Gaman et al. ........... 428/654 |

FOREIGN PATENT DOCUMENTS

ES    2 036 452    *  5/1993

* cited by examiner

*Primary Examiner*—Kuang Y. Lin
(74) *Attorney, Agent, or Firm*—Schultz & Associates

(57) ABSTRACT

The method for making a termination for a wire rope entails inserting a first end of the wire rope end into a mold, wherein the mold comprises a mold opening; placing a crucible on the mold, adding a separator to the crucible over an opening in the crucible, adding an exothermic metallic material to a crucible, igniting the exothermic metallic material to form a molten material that liquefies the separator; flowing the liquefied separator onto the end of the wire rope forming a termination capable of sustaining a higher break force than the wire rope. Other embodiments of the method entail using a liquid adhesive to form the termination.

7 Claims, 5 Drawing Sheets

METHOD FOR MAKING A TERMINATION FOR A WIRE ROPE FOR MINING EQUIPMENT

FIELD

The present embodiments relate to methods for making a termination for a wire rope for mining equipment. The formed termination in the wire rope is capable of sustaining a higher break force than the wire rope.

BACKGROUND

Terminations are used in the mining industry to connect wire ropes to mining equipment.

Methods for forming wire rope terminations are taught in Lucas U.S. Pat. No. 6,170,145; Lucas U.S. Pat. No. 6,035,692; and Jensen U.S. Pat. No. 2,151,032.

A need for a labor saving method for use in the field to create terminations for use with mining equipment. Another need has existed for a much safer technique to use in mines for creation of terminations for wire rope. A need has also existed for a lighter termination which still has great strength to use on excavating buckets and draglines in the mining industry. The present embodiments meet these needs.

SUMMARY

The method for making a termination for a wire rope entails inserting a first end of the wire rope end into a mold, wherein the mold comprises a mold opening; placing a crucible on the mold, adding a separator to the crucible over an opening in the crucible, adding an exothermic metallic material to a crucible, igniting the exothermic metallic material to form a molten material that liquefies the separator; flowing the liquefied separator and molten exothermic metallic material onto the end of the wire rope forming a termination capable of sustaining a higher break force than the wire rope. Other embodiments of the method entail using a liquid adhesive to form the termination.

BRIEF DESCRIPTION OF THE DRAWINGS

In the detailed description of the preferred embodiments presented below, reference is made to the accompanying drawings, in which.

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular descriptions and that the embodiments can be practiced or carried out in various ways.

The present embodiments are designed to improve safety in the mines with terminations by eliminating the need for dangerous machinery to knock out the wedges in the terminations. The present embodiment are also designed to remove the need to loop the wire ropes over into a wedge that can hit a worker on the head, break an arm, or even kill someone.

The present embodiments are designed to provide a method for making terminations that are lighter and easier to handle than conventional terminations.

The present embodiments are designed to provide a method for making terminations without heat, using a liquid adhesive.

The methods embodied herein are for making a termination for a wire rope for excavation equipment, such as mining equipment.

The present embodiments relate to methods for making terminations on wire rope for use on dragline buckets or similar earth relocating components.

The connection of the wire rope for the mining industry must be capable of sustaining a higher break force than the wire rope. The methods result in a heavy duty connection that weighs appreciably less than similarly sized wire ropes with typical connections, up to or exceeding 50% less. For example, a current style connection could weigh 6000 pounds for a 4 ⅜ inch diameter wire rope. Using the embodied methods, the connection would only weigh between 1500 pounds and 2800 pounds for the same diameter wire rope.

With reference to the figures, the methods for making terminations on wire rope entail using a wire rope. Preferably, the methods are for use with wire ropes with a diameter between ¼ inches and 7 inches. Typical wire ropes are made of steel, alloys of steel and combinations thereof. The wire rope can be a single strand rope or a multi-strand rope.

Figure 1:
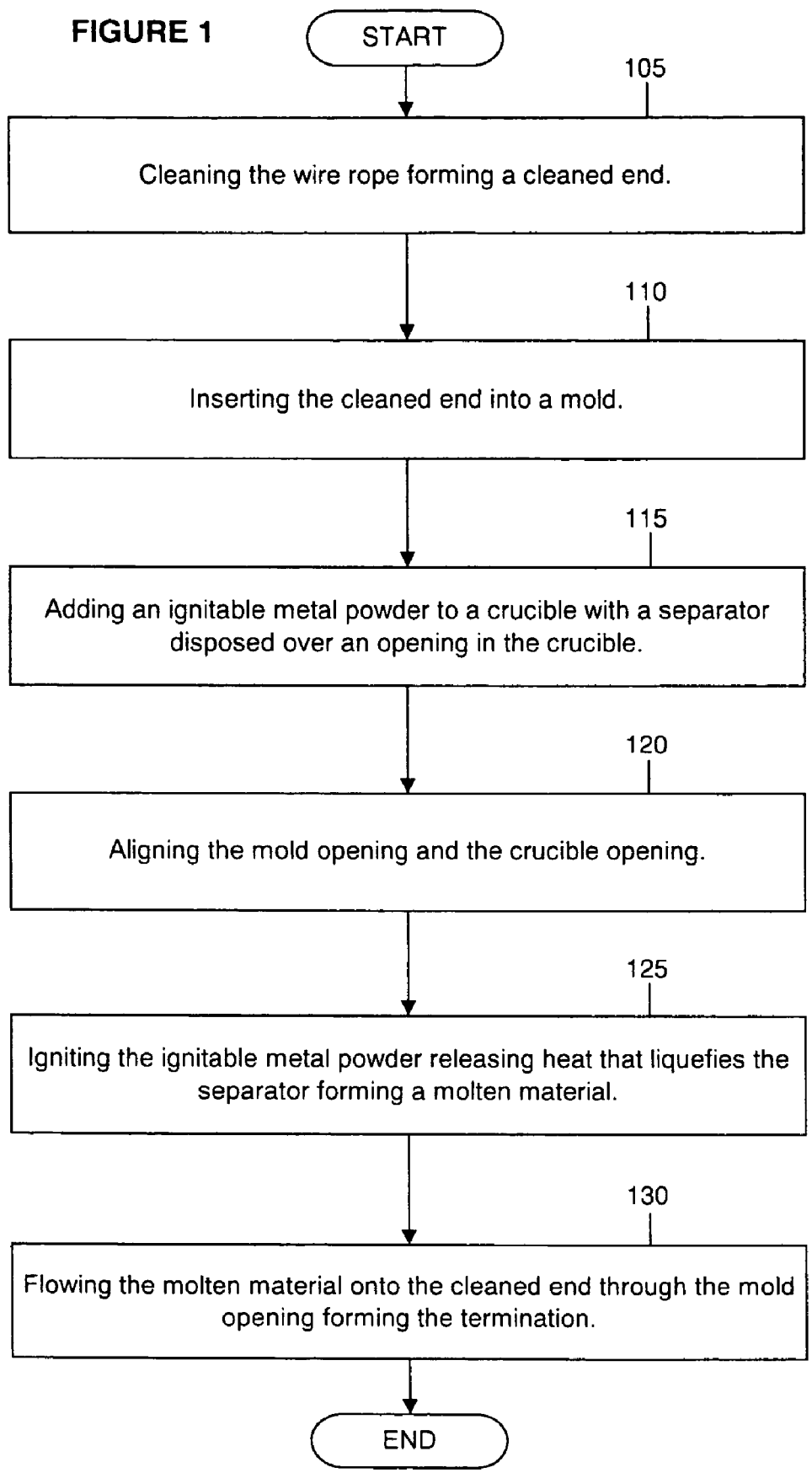
FIG. 1 provides a flow chart of the steps of a preferred embodiment of the method of the invention.
Figure 2:
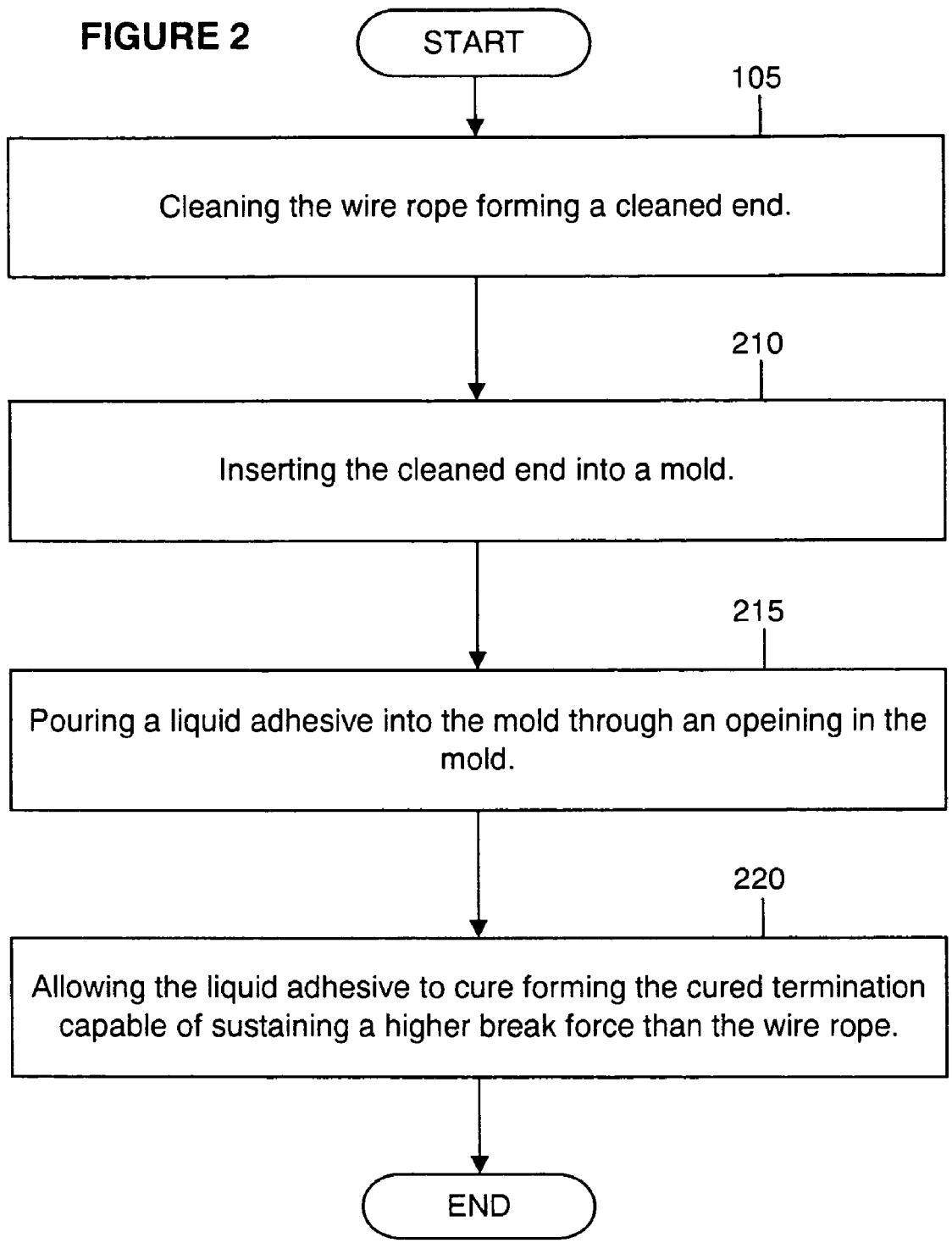
FIG. 2 provides a flow chart of the steps of a preferred embodiment of the method of the invention.
Figure 3:
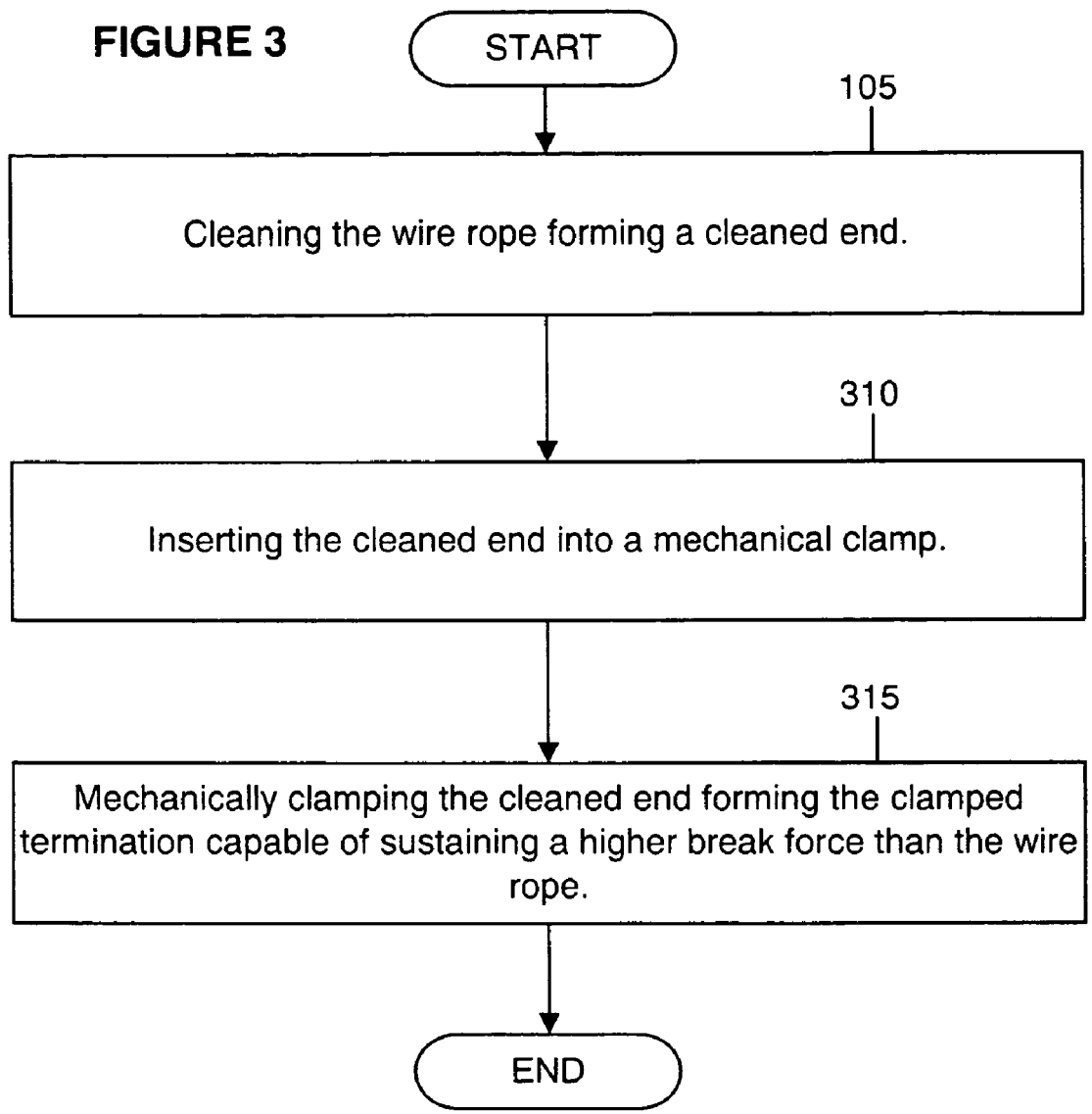
FIG. 3 provides a flow chart of the steps of a preferred embodiment of the method of the invention.
Figure 4:
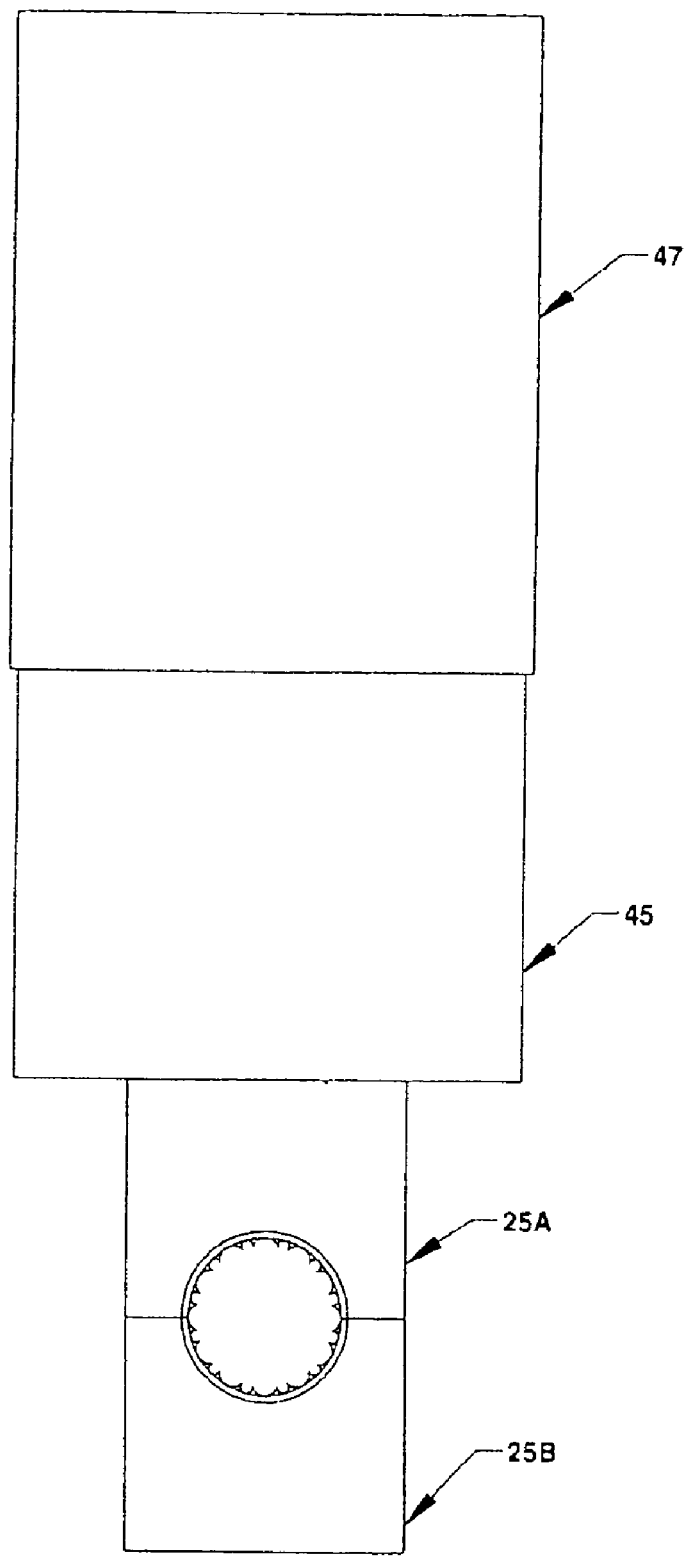
FIG. 4 depicts a front view of the assembled apparatus used in making the termination for a wire rope using exothermic metallic powder.

The method utilizes the equipment of FIG. 4 to make a termination on the end of the wire rope (15) using an exothermic metallic material. In an alternative embodiment, a liquid adhesive can be used.

One end of the wire rope is inserted into a mold. A mold, as depicted in FIG. 4, is a two part mold with a top part (25*a*) and a bottom part (25*b*). The mold has a mold opening. The external shape of the mold can be any number of shapes, preferably a rectangular shape. The internal side of the mold can have a conical, cylindrical, or even rectangular shape. The internal shape dictates the resultant shape of the termination. For example, the mold can be shaped so the termination is a male connection or a female connection.

The mold opening can be rectangular, but an elliptical shape or round shape or other shape can be used. The opening should have a diameter that is adequate to permit molten metal to flow into the mold from another source.

The overall external dimensions of the mold can be a height of between about 6 inches and about 20 inches; 10 inches is a preferred example. The width of the mold can range from about 6 to about 16 inches; 8 inches is a preferred example. The length of the mold can range from about 8 to about 24 inches; 12 inches is a preferred example.

The mold is preferably made of graphite or other materials that are very heat resistant.

A crucible (45) is placed on the mold. FIG. 4 depicts a view of the assembled apparatus used in the method.

The crucible is preferably made of graphite or a heat resistant material that will not deform in the presence of high heat. The crucible has a crucible opening located at the bottom of the crucible (45). A separator is disposed over the crucible opening (50).

The dimensions of the crucible are between 10 and 18 inches in height (preferably 12 inches), between 10 and 20 inches in width (preferably 14.5 inches), and between 10 and 30 inches in length (preferably 15 inches). The crucible dimensions need to coincide with the dimensions of the mold into order to work in a safe manner. The crucible opening has a shape that can be rectangular, ellipsoid, or another usable shape for flowing liquefied metal into the crucible.

Typically, the separator is a low carbon metal; however, any sacrificial material can be used that will keep the exothermic metallic material separate from the mold until ignition of the exothermic metallic material. The separator has a typical width between 3 inches and 5 inches with a thickness of 10 gauge. The plate has a width between 2 inches and 6 inches in width and a length between 4 inches and 8 inches with a thickness that can range in a corresponding manner.

The exothermic metallic material placed into the crucible is preferably a powered metallic material. Examples of usable powdered metals include aluminum, copper, alloys of aluminum and alloys of copper, oxides of these metals, particularly including copper oxide and combinations of these materials can be used as the exothermic metallic material.

A baffle (47) is inserted over the crucible (45) to contain the heat and direct any resulting vapors out a baffle opening (51). The baffle is preferably the same or similar shape to that of the crucible. The baffle is preferably made from steel plate. The baffle has at least one internal baffle for deflecting the heat or and possible the cooling of the vapor or gas flow from the crucible.

The baffle can have a length ranging between 11 inches to 31 inches, a width ranging between 11 inches to 21 inches, and a height ranging between 11 inches to 19 inches in length. The preferred dimensions are 16 inches in length, 15 inches in width, and 18 inches in height.

The exothermic metallic material is kindled in the crucible (45). The exothermic metallic material can be kindled using a striker, a torch, a flame, or other similar heat sources, and combinations thereof. Once kindled, the exothermic metallic material burns very hot and very fast. The exothermic metallic material, which can be granules, a powder, or small metal chips, forms a ductile and malleable material and liquefies the separator forming a molten material.

The molten material flows into the mold (25) through the mold opening and comes into contact with the end (20) of the wire rope (15). The molten material takes the form of the mold (25) around the end (20) forming the termination (10). The resultant termination (10) is lighter than conventional terminations and is capable of sustaining a higher break force than the wire rope.

FIG. 4 shows a front view of the crucible (45) with the mold (25) and a preferable circular opening for engaging the wire rope.

Figure 5:
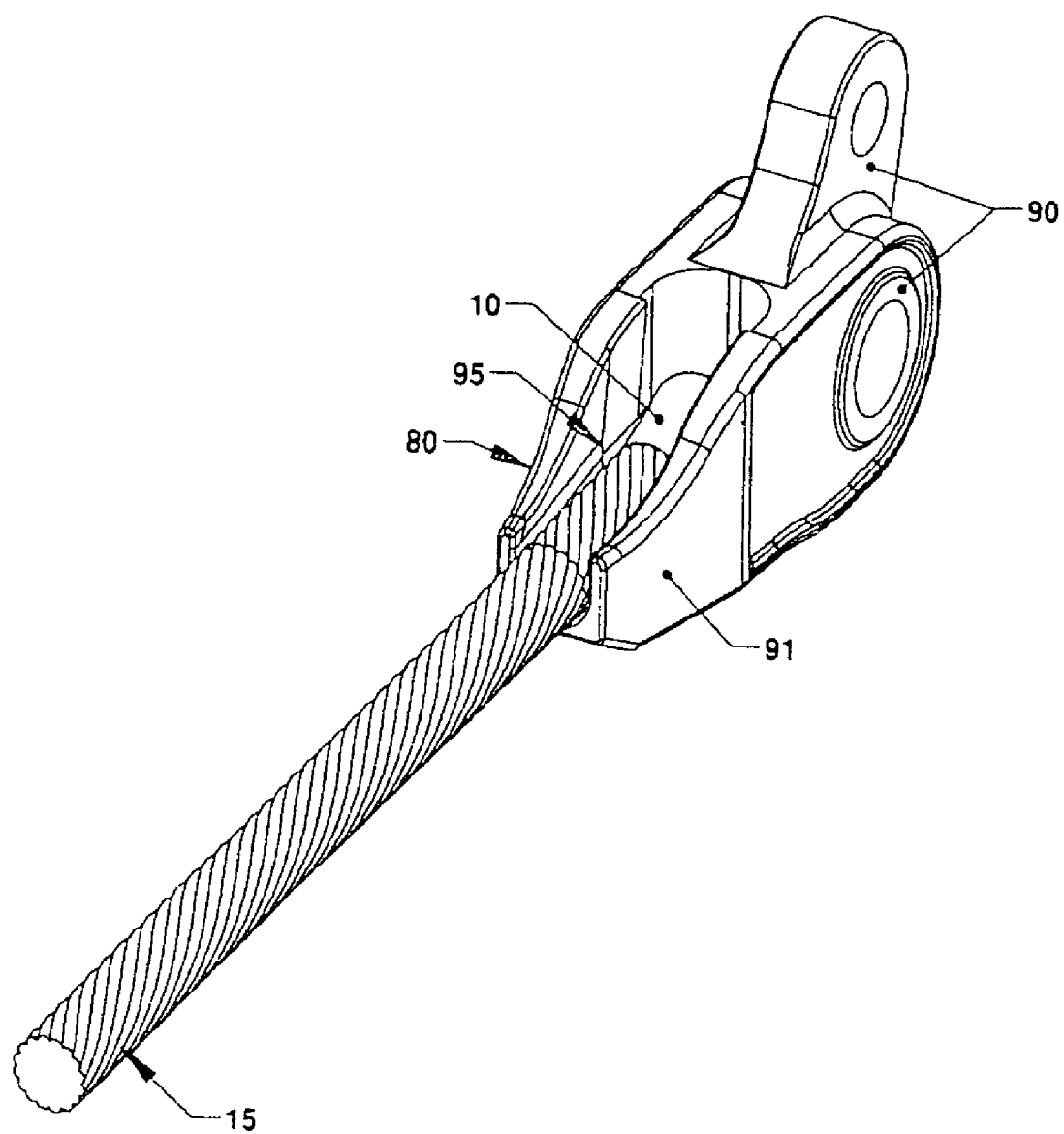
FIG. 5 depicts a top perspective view of a socket usable with the termination.

FIG. 5 shows that the wire rope with termination can engage a socket for increased flexibility of use. The socket (91) has an opening (95). The socket further has a first connector end (90) adapted to engage mining equipment; and a second connector end (80) to engage the termination (10) on the wire rope (15).

Another method embodiment entails making a termination using a liquid adhesive.

In this method, the wire rope first end is placed in a mold. A liquid adhesive (70) is then poured into the mold (25) through the mold opening (35) covering the end of the wire rope. Examples of usable liquid adhesives include an epoxy, such as a Devcon™ aluminum epoxies from Illinois Tool Work (ITW) Devcon of Illinois, USA. Epoxies from 3-M of Minnesota USA are also contemplated as usable herein, as well as other epoxies that are strong and bond to steel.

The liquid adhesive is allowed to cure in the mold (25) forming a cured termination capable of sustaining a higher break force than the wire rope. The liquid adhesive may need to be heated to room temperature if the method is performed in a cold climate.

If the resultant termination (10) is formed into a male connection, the male connection can be readily inserted into a socket. The socket has an equipment connector on one end adapted to engage mining equipment and a wire rope connector on the other end adapted to engage the termination.

In an optional step, the wire rope can be cleaned prior to placing in the mold. The cleansing step can be performed by any normal means of cleaning a substance. The preferred methods for cleaning one end of the wire is either by using a torch, by using chemicals to remove dirt, and combinations thereof. The cleaned end (20) is inserted into a mold (25) that has a mold opening (35).

The embodiments have been described in detail with particular reference to certain preferred embodiments thereof, but it will be understood that variations and modifications can be effected within the scope of the embodiments, especially to those skilled in the art.

What is claimed is:

1. A method for making a connection on a mining dragline comprising the steps of:
   a. providing a multistrand steel mining dragline of between 4 and 7 inches in diameter having a first end and a second end;
   b. inserting the first end into a mold, wherein the mold comprises a mold opening;
   c. placing a crucible with a crucible opening over the mold wherein the mold opening is in fluid communication with the crucible opening;
   d. placing a separator in the crucible over the crucible opening;
   e. adding an exothermic metallic material to the crucible;
   f. placing a baffle on top of the crucible;
   g. igniting the exothermic metallic material forming a molten material which liquefies the separator in the crucible;
   h. flowing the molten material into the mold around the first end forming a frustroconical termination capable of sustaining a higher break force than the wire rope;
   i. providing a socket, weighing between 1500 lbs. and 2800 lbs., having a slotted opening parallel to the longitudinal axis of the mining dragline, and having an open frustroconical portion;
   j. providing a pair of connector holes in the socket generally perpendicular to the longitudinal axis of the mining dragline;
   k. inserting the wire rope into the slotted opening from a direction perpendicular to the longitudinal axis of the mining dragline;
   l. abutting the frustroconical termination against the open frustroconical portion; and
   m. connecting at least one of the pair of connector holes to a drag chain connected to a mining excavation bucket.

2. The method of claim 1, wherein the mold forms the frustroconical termination into a male connection.

3. The method of claim 1 wherein the exothermic metallic material comprises a powdered metallic alloy.

4. The method of claim 3, wherein the powdered metallic alloy is drawn from the group consisting of aluminum, copper and tin.

5. A method for making a termination for a wire rope having a first end and a second end, comprising the steps of
   a. providing that the wire rope be of a diameter between about 4 inches and about 7 inches;
   b. inserting the first end into a mold, wherein the mold comprises a mold opening;
   c. pouring a liquid adhesive into the mold through the mold opening;
   d. allowing the liquid adhesive to cure forming a frustroconical termination capable of sustaining a higher break force than the wire rope;
   e. producing a socket, weighing between 1500 lbs and 2800 lbs., having a slotted opening parallel to the longitudinal axis of the wire rope, an open frustroconical portion and a pair of connector holes generally perpendicular to the longitudinal axis of the wire rope;
   f. inserting the frustroconical termination into the slotted opening using a force applied to the wire rope perpendicularly to the longitudinal axis of the wire rope; and
   g. connecting the at least one of the pair of connector holes to a drag chain connected to a mining excavation bucket.

6. The method of claim 5, wherein the wire rope is a single strand rope or a multi-strand rope.

7. The method of claim 5, wherein the mold forms the frustroconical termination into a male connection.

* * * * *